United States Patent Office 2,784,806
Patented Mar. 12, 1957

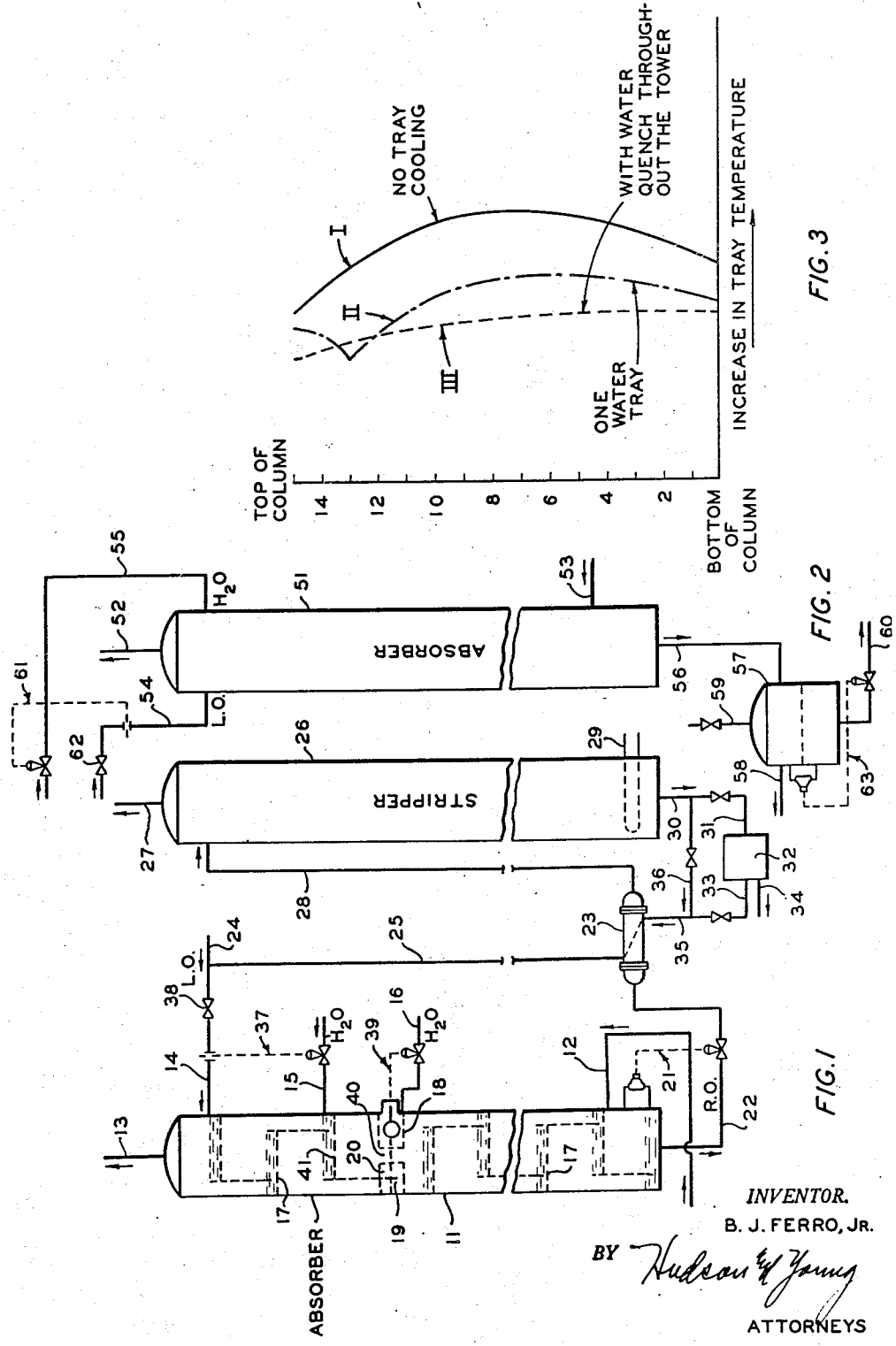

2,784,806
WATER-QUENCH ABSORPTION CYCLE

Bernardo J. Ferro, Jr., Bartlesville, Okla., assignor to Phillips Petroleum Company, a corporation of Delaware Application December 1, 1952, Serial No. 323,435

3 Claims. (Cl. 183—114.6)

This invention relates to absorber operations. In one aspect it relates to improved absorber operations for the absorption of condensible constituents of natural gases.

It is known that absorbers operated at lower temperatures are more efficient for absorbing desired constituents from gases than absorbers operated at higher temperatures. Absorber operation is dependent upon the physical phenomena that the solubility of gases in liquids increase with a decrease of temperature providing no chemical reaction occurs. Thus, if an absorber temperature is maintained at relatively low value the absorbing power of the oil is greater than if the absorber is operated at some higher temperature. One factor limiting the temperature at which absorbers may be operated is the cooling water of an industrial plant. The minimum temperature which can ordinarily be obtained in such cooling towers is that which is obtainable by the evaporation of a portion of cooling water into the atmosphere.

Cooling water temperature available in many industrial plants varies from about 85 to 90 or 95° F. Gasoline plant absorbers operate very well if the absorbent temperature can be maintained at about 90° F. It is relatively simple to cool a lean absorption oil to that temperature for introduction into the absorber. However, after the oil has absorbed some gaseous constituents its temperature increases. Upon further absorption of gaseous constituents the temperature increases still further and ultimately a temperature may be reached at which absorption is not efficient and gases which are desired to be absorbed and recovered will be lost in the residue gas. Thus, it is very advantageous to maintain the temperature of the absorber throughout the length of the absorption zone at as low a temperature as practical.

Prior art discloses cooling coils on an absorber tray for cooling the absorbent. Such methods are relatively efficient but are limited in their degree of cooling. Other known methods involve removal of a portion or all of the absorption oil from a given tray and cooling it by some exterior means then reintroducing the cooled oil on the next lower tray. Such an operation involves use of relatively large heat exchange equipment and sufficient pumping capacity to transfer all of the absorption oil. Heat exchange coils may be positioned on one or more trays of the absorption column or the absorption oil may be removed from one or more trays in the column in an attempt to maintain the absorbents at as low a temperature as possible.

I have discovered a method for maintaining temperature of an absorption oil at a relatively low value without the use fo heat exchange coils on absorber trays and also without removing all or part of the absorption oil from a tray, and cooling it in an exterior heat exchange means followed by reintroduction of the cooled oil into the column.

According to my invention, I find that it is very advantageous to introduce water directly into an absorption column and permit direct contact of the water with the absorption oil. According to my invention cooling plant water may be introduced in direct contact with the absorption oil on the top tray or on any tray in the column and removed from the next lower tray or from any lower tray in the column or even it may be removed with the absorption oil from the bottom of the column. Where this water is withdrawn with the rich oil a water and rich oil separator is provided. In this manner the heat exchange across tubes is eliminated and I am able to obtain complete transfer of heat from the absorption oil to the water. About the only requirement necessary for the operation of my invention is to maintain the absorption oil in a relatively pure and clean condition and to use a water separating means.

One object of my invention is to improve the efficiency of absorber operation.

Another object of my invention is to devise a simple and inexpensive method for increasing the efficiency of absorber operation. Still another object of my invention is to devise an absorption process of increased efficiency which can be carried out in conventional absorption equipment with little modification.

Still other objects and advantages of my invention will be realized upon reading the following description which taken with the attached drawing forms a part of this specification.

In the drawing:

Figure 1 represents diagrammatically a form of apparatus for carrying out one embodiment of my invention.

Figure 2 illustrates in diagrammatic form apparatus useful in carrying out another embodiment of my invention.

Figure 3 illustrates in graphical form advantages of my invention.

Referring now to the drawing and specifically Figure 1, reference numeral 11 identifies a more or less conventional absorption column. This column is provided with an inlet line 12 for introduction of gases to undergo absorption and a residue gas line 13. Lean absorption oil is introduced at the top of the column through a line 14 and rich oil is withdrawn from the bottom of the column through a line 22. A line 15 is provided as shown for introduction of cooling water directly onto a tray of the column. The line 16 is shown for removal of water from the next lower tray. The column may be provided with conventional bubble cap vapor-liquid contact trays 17. However, the column may be provided with other types of liquid-vapor contacting equipment provided water can be added and withdrawn as desired. Reference numeral 18 identifies a donut type tray or other tray adapted for separating water from the absorption oil. Reference numeral 19 identifies the settled water phase while numeral 20 is the oil phase. The absorption oil phase 20 may flow through an opening 40 to the next lower tray, or a conventional downspout or overflow weir assembly similar to others of the column may be provided if desired. One important function of the opening 40 is of course to permit passage of the vapors from below tray 18 to the space above tray 15 without bubbling through the water and oil. A liquid level controller apparatus 39 is provided for controlling the withdrawal of the water phase from the tray 18. A liquid level controller apparatus 21 is provided for removal of the rich oil from the bottom of the column.

Rich oil from line 22 passes through a heat exchanger 23 for increasing the temperature of the rich oil. The heated rich oil passes on through a line 28 and is introduced to a conventional stripper vessel 26. Stripped absorption oil is withdrawn from stripper 26 through a line 30. Steam for carrying out the stripping operation is introduced through a line 29. The stripped gases and stripping steam are removed from the column through an overhead line 27 for such disposal as desired.

The stripped absorption oil is removed through line 30 and passed through lines 36 and 35 to heat exchanger 23 for cooling. The cooled absorption oil is then passed on through a line 25 and valve 38 for introduction into the absorber by way of line 14. Make-up absorption oil as required may be introduced into the system through a line 24.

As mentioned hereinbefore it is preferable to maintain the absorption oil in a clean and fully absorptive condition. In order to maintain the absorption oil in such a condition it is desirable to purify the absorption oil preferably by distillation. A small fraction of 1 percent of the oil is passed from line 30 through a line 31 and distilled in apparatus 32. The still vapors are withdrawn through a line 33 and added to the main portion of the absorption oil entering line 35 from line 36. The bottoms or impurity from the absorption oil separated in apparatus 32 is withdrawn through a line 34 for disposal.

Explanation of the operation of an absorption oil purifier will not be given in detail for purposes of brevity and simplicity. This operation may be carried out according to methods described in U. S. Patents 2,339,680, 2,417,007, or 2,363,176.

As disclosed in one of the foresaid patents the absorption oil purifying operation is carried out on a small fraction of the rich oil in place of on a small fraction of the lean oil.

As an illustration of the operation of the embodiment of my invention illustrated in Figure 1 absorption oil is introduced through line 14 and cooling plant water introduced through line 15 may be passed into the column in equal volume. For control of the ratio of the water to oil I have provided a valve 38 for controlling the flow of the absorption oil into the column and depending upon the rate of introduction of this lean absorbent into the column the addition of the water is so controlled. The rate of flow controller apparatus 37 may be so adjusted as to point the same volume of water to flow through line 15 as the volume of the oil flowing through the line 14, or more or less water as desired. As is known in the absorption art the temperature of the absorption oil on the top several trays of an absorber increases quite markedly. I have shown for illustrative purposes the introduction of the cooling water on the third tray from the top of the tower. At this point then the temperature of the partially enriched absorbent will be markedly reduced upon direct contact with the cool water. This cooling water tray is identified in Figure 1 by reference numeral 41. On this tray the oil phase and the water phase are maintained in the thoroughly and completely agitated condition by the passage through these phases of the gases undergoing absorption. The mixed phases of liquid flow over the weir and down to the next lower tray identified by reference numeral 18. Oil and water phases separate on this tray. The float controller apparatus 39 operates a motor valve to withdraw this water through line 16. The water in line 16 then passes to the plant cooling apparatus to be cooled and prepared for reuse. The curve II of Figure 3 illustrates the type of cooling carried out according to the operation just described in relation to Figure 1. The highest point of curve II illustrates the relatively high temperature at the point of rapid absorption on the top tray. Since the upflowing gases undergoing absorption are cooled somewhat on trays 18 and 41 (Figure 1), that is on the water containing trays, they will exhibit some cooling action upon the absorption oil in higher trays. Thus the first portion of the curve II will illustrate this drop in temperature. The minimum temperature of course is reached at the trays containing the water. As the absorption oil flows downward from tray 18 its temperature will increase in proportion to the amount of hydrocarbons absorbed throughout the lower portion of the absorber.

Curve I of Figure 3 is a curve of an absorption operation in which no cooling whatever is carried out on any of the trays. In comparison of curves II and I it will be seen that curve II is at the left hand side of curve I throughout its entire length. This positioning of curve II stresses the effect of the addition of water to an absorber.

Illustrations of the effectiveness of the direct water quench on a given absorber tray is the following: The specific heat for liquid water is 1 B. t. u. per degree Fahrenheit per pound of water. The specific heat for the mineral seal absorption oil is about .6. Specific gravity of water may be considered as 1 while the specific gravity of mineral seal oil is herein taken as about .8. One gallon of water will then absorb approximately 8.33 B. t. u. per degree Fahrenheit rise of temperature, while 1 gallon of mineral seal oil will absorb .8×.6×8.33=4 B. t. u. per degree Fahrenheit. Therefore, the inclusion of one gallon of water per gallon of mineral seal oil will decrease the temperature rise throughout the absorber by the ratio of 12.33:4 or approximately 3:1. Thus, if a conventional absorber will experience a 12° F. rise, when one gallon of water is added per gallon of mineral seal oil the temperature rise will be only about 4° F. These calculations are based on the assumption that the water and the mineral seal oil are introduced into the tower at the same temperature. If the temperature rise is limited to 4° in place of 12° there is an 8 degree temperature advantage maintained throughout. It is known that a few degrees, even an 8 degree difference maintained in an absorber oil temperature markedly improves the degree of hydrocarbon recovery.

The second embodiment is illustrated in Figure 2 of the drawing. In this figure reference numeral 51 identifies a conventional absorber vessel which may be constructed in general similar to absorber 11 of Figure 1. Raw gas to be treated by absorption is introduced into the absorber through a line 53 while residue gas is withdrawn through a line 52. Lean absorption oil is introduced into the column through line 54 while the water for cooling purposes is introduced through a line 55. The rich absorption oil and water mixture are removed from the bottom of the column through a line 56 and is passed to a separator tank 57. In this tank oil separates from the water. The rich oil phase is withdrawn from vessel 57 to line 58 while the water is withdrawn in response to a flow controller apparatus 63 through a line 60. This water from line 60 may be passed directly to a cooling apparatus for cooling to reuse in the operation. Line 59 is provided for pressure relief as necessary. In line 54 is provided a valve 62 for controlling the flow of lean absorption oil through line 54 into the absorber. Reference numeral 61 identifies the ratio flow controller apparatus which is intended to control the rate of introduction of water into the absorber in response to the rate of introduction of the lean absorption oil.

This embodiment of my invention possesses a distinct advantage over the embodiment illustrated in Figure 1 of the drawing. According to Figure 2 the cooling water is introduced on the same tray, for example the top tray of the column, with the lean absorption oil and then two immiscible liquids flow together throughout the absorber. In this manner the water exerts its cooling effect directly throughout the entire length of the column by absorbing a major portion of the heat of absorption released by the dissolved hydrocarbons. Upon reference to Figure 3 of the drawing curve III illustrates the type of cooling obtained according to the embodiment of Figure 2. Since the water remains in the column in direct contact with the absorption oil, all points of curve III will be on the low temperature side of the corresponding points on curve II excepting at the water addition point of curve II. The reason for this one point of curve II being on the left hand side of the corresponding point on curve III is that the water added to the top of column 51, Figure 2, as represented by curve III has become warmed slightly by the time it reaches the tray which corresponds to the low temperature point of curve II.

By use of cold water for cooling the absorption oil in absorption operations as mentioned above I am able to operate absorbers at an increased efficiency. The temperature differential of about 10° F. is frequently required for operation of closed tube heat exchanger. Thus if a heat exchanger coil is installed in an absorber tray it is impossible to cool the absorber oil to a temperature within 10° of the temperature of the cooling water. Thus, by employing the operation of my invention, I am able to cool the absorption oils to a temperature closer to that of the available cooling water. For example, if cooling water is available at 85° F. and an absorption oil has previously been cooled to 100° F., a closed coil cooled by the 85° water can cool the oil to only about 95° F. at a required plant rate while by using my invention I can cool the oil to the cooling water temperature of 88° to 90° F. In this manner by the use of open cooling water in direct contact with absorption oil, I am able to operate absorbers at considerably lower than conventional temperatures and increase absorption plant recovery.

In Figure 1 I have illustrated the addition of water on the third tray from the top of the column. It is obvious that the water may be added to any desired tray and likewise it may be withdrawn from the next tray below the addition point or from any other tray below the addition point. When water is used for cooling throughout the length of the absorber substantially the entire column is maintained at a lower than normal temperature and this embodiment is preferred. When the embodiment according to Figure 2 is used, the absorption oil should be maintained in a clean condition by distillation of a portion of the oil as described in the embodiment of Figure 1. The absorption oil in both embodiments should be maintained very clean and free from solid or liquid impurities so that the water when in direct contact with the oil will not form a stable emulsion. As is known when absorption oils become dirty with fine rust and tars, etc., they are good emulsifying agents.

Such auxiliary apparatus as valve, pumps, temperature and pressure indicating, recording and control apparatus are not illustrated or described for purposes of brevity. The need of such apparatus, its installation and operation are well understood by those skilled in the art.

While certain embodiments of the invention have been described for illustrative purposes, the invention obviously is not limited thereto.

Having disclosed my invention I claim:

1. An absorption process comprising introducing a lean absorbent oil into a rapid temperature increase section in the upper portion of an absorption zone, introducing gas containing constituents absorbable in said absorbent into the lower portion of said zone, introducing cooling water directly into a water cooling section of said zone immediately below said rapid temperature increase section, contacting in direct heat exchange relation the absorbent oil and added water in said water cooling section, separating the contacted absorbent oil and water into separate liquid phases in said zone, withdrawing the separated water phase from the operation, flowing only the entire separated absorbent oil phase downward from the liquid phase separating step in said zone and therein contacting only said gas containing absorbable constituents and the downflowing entire separated absorbent oil phase, withdrawing gas deleted of absorbable constituents from the portion of said absorption zone above said rapid temperature increase section as one product of the process, withdrawing absorbent oil containing said absorbable constituents from the lower portion of said zone, heating and stripping said absorbable constituents therefrom in a separating operation to form said lean absorbent oil and removing stripped constituents from this heating and stripping operation as a second product of the process.

2. In the absorption process of claim 1 wherein the gas containing absorbable constituents is a hydrocarbon gas and the absorbent oil is a mineral seal oil.

3. An absorption-stripper apparatus comprising, in combination, an absorption column provided with vapor-liquid contacting trays, an inlet for lean absorbent oil communicating with an upper tray, an outlet for lean gas communicating with the upper portion of said column, a rich gas inlet communicating with lower portion of said column, a liquid phase separating tray in said column intermediate the lean oil inlet and the rich gas inlet but nearer the lean oil inlet than the rich gas inlet, a first conduit for inlet of water to said column at least one tray above said liquid phase separating tray and at least one tray below the lean absorbent liquid inlet, a second conduit for outlet from the system of the heavier liquid phase only of two immiscible liquid phases of unlike specific gravities from the liquid phase separating tray, a separate stripper column, means for adding processing heat to the kettle section of said stripper column, a third conduit for passage of lean absorbent oil from the kettle section of said stripper column to the inlet for lean absorbent to said absorption column, a fourth conduit for passage of rich absorbent from the lower portion of said absorption column to the upper portion of said stripper column, an outlet for stripped material from the upper portion of said stripper column and a heat exchange means for heat exchanging said rich absorbent oil in said fourth conduit with said lean absorbent oil in said third conduit.

References Cited in the file of this patent

UNITED STATES PATENTS

| 1,328,680 | McGinnis | Jan. 20, 1920 |
| 1,351,151 | Bayer | Aug. 31, 1920 |
| 1,730,152 | Lewis | Oct. 1, 1929 |
| 1,808,087 | Urguhart | June 2, 1931 |
| 2,198,142 | Wade | Apr. 23, 1940 |
| 2,241,717 | Robinson et al. | May 13, 1941 |
| 2,330,676 | Buckley | Sept. 28, 1943 |
| 2,395,362 | Welling | Feb. 19, 1946 |
| 2,487,576 | Meyers | Nov. 8, 1949 |
| 2,638,437 | Ragatz | May 12, 1953 |
| 2,715,948 | Lewis et al. | Aug. 23, 1955 |